(12) United States Patent
Noda et al.

(10) Patent No.: US 6,682,007 B2
(45) Date of Patent: Jan. 27, 2004

(54) SPINNING REEL HAVING IMPROVED SPOOL OSCILLATING MECHANISM

(75) Inventors: Hideo Noda, Kasaoka (JP); Masahiro Saeki, Kasaoka (JP); Atsuhito Okada, Kasaoka (JP)

(73) Assignee: Kabushiki Kaisha Johshuya, Tokyo (JP)

( * ) Notice: Subject to any disclaimer, the term of this patent is extended or adjusted under 35 U.S.C. 154(b) by 0 days.

(21) Appl. No.: 10/057,971

(22) Filed: Jan. 29, 2002

(65) Prior Publication Data
US 2002/0130209 A1 Sep. 19, 2002

(30) Foreign Application Priority Data

Mar. 15, 2001 (JP) ...................................... P2001-073235

(51) Int. Cl.7 ............................................... A01K 89/01
(52) U.S. Cl. ....................................... 242/241; 242/273
(58) Field of Search ................................ 242/241, 242, 242/273, 278, 279

(56) References Cited

U.S. PATENT DOCUMENTS

| | | | | |
|---|---|---|---|---|
| 4,416,428 A | * | 11/1983 | Noda | 242/241 |
| 4,512,531 A | * | 4/1985 | Tunoda | 242/241 |
| 6,179,236 B1 | * | 1/2001 | Jang | 242/273 |
| 6,290,157 B1 | | 9/2001 | Shibata | |
| 6,394,380 B2 | * | 5/2002 | Takikura | 242/279 |
| 6,460,792 B1 | * | 10/2002 | Morimoto et al. | 242/241 |
| 6,484,956 B2 | * | 11/2002 | Kawabe et al. | 242/278 |

FOREIGN PATENT DOCUMENTS

| | | |
|---|---|---|
| JP | 60-26626 | 8/1985 |
| JP | 3-31860 | 3/1991 |
| JP | 7-44132 | 11/1995 |
| JP | 11-86 | 1/1999 |

* cited by examiner

*Primary Examiner*—Emmanuel M. Marcelo
(74) *Attorney, Agent, or Firm*—McGuireWoods LLP (57) ABSTRACT

A spinning reel with a handle shaft rotatably supported in a reel body. The handle shaft is connected with a handle. A master gear and a driving spiral gear are provided at separated positions on the handle shaft. The master gear is meshingly engaged with a pinion gear provided integrally with a rotor at the front of the reel body so that rotation of the handle rotates the rotor. A spool shaft fixed with a spool extends in a frontward/rearward direction of the reel body and is oscillatingly movably supported on the reel body. A traverse camshaft is rotatably supported by the reel body. The traverse camshaft is fixedly provided with a driven spiral gear and is formed with a cam groove. A slider member is fixed to the spool shaft and has a pawl engaged with the cam groove so that the slider member is driven to move along the length of the traverse camshaft by rotation of the traverse camshaft. At least one intermediate spiral gear is provided for transmitting rotation of the driving spiral gear to the driven spiral gear.

10 Claims, 5 Drawing Sheets

FIG.12

SPINNING REEL HAVING IMPROVED SPOOL OSCILLATING MECHANISM

BACKGROUND OF THE INVENTION

1. Field of the Invention

The present invention relates to a spinning reel, and more particularly to a spool oscillating mechanism in the spinning reel.

2. Description of the Related Art

A spinning reel generally includes a reel body, a spool, a rotor, and a handle. The spool and the rotor are provided at the front end of the reel body. Rotating the handle rotates the rotor around the outside of the spool and oscillates the spool in its axial direction. Rotation of the rotor wraps fishing line, via a fishing line guide of the rotor, around a fishing line winding portion of the spool. The oscillating movement of the spool ensures that the fishing line is wrapped evenly over the entire fishing line winding portion.

To achieve this fishing line winding operation, the spinning reel includes a handle shaft, a spool shaft, a master gear, a pinion gear, and a spool oscillating mechanism. The handle shaft is rotatably supported on the reel body. The master gear is coaxially and integrally provided on the handle shaft. The spool shaft extends in a front-to-rear direction of the reel body and is oscillatably supported by the reel body. The spool is fixed to the spool shaft. The pinion gear is provided integrally with the rotor and is meshingly engaged with the master gear. The master gear and the pinion gear are provided with a gear ratio for accelerating rotational speed of the rotor as much as possible in order to increase the amount of fishing line that is wound each time the handle is rotated once.

The spool oscillating mechanism includes a traverse camshaft, a slider member, and a driven gear. The traverse camshaft extends in parallel with the spool shaft and is rotatably supported by the reel body. A cam groove is formed in the outer peripheral surface of the traverse camshaft. The cam groove has a spiral shape that intersects itself by circling around the traverse camshaft at one portion thereof and then circling back again. The slider member is fixed to the spool shaft and has a pawl engaged in the cam groove. The slider member moves in the lengthwise direction of the traverse camshaft upon rotation of the traverse camshaft. The driven gear is provided coaxially and integrally with the traverse cam. The driven gear is drivingly connected to the pinion gear by direct or indirect meshing engagement with the pinion gear.

Rotation of the handle rotates the master gear about its axis to rotate the pinion gear, and consequently the rotor. The rotation of the pinion gear also drives oscillating movement of the spool via the spool oscillating mechanism. That is, the rotation of the pinion gear rotates the driven gear and rotation of the driven gear rotates the traverse camshaft about its axis, so that slider member moves frontward and rearward along the traverse camshaft because of engagement the pawl in the cam groove. This movement of the slider member in its axial direction oscillates the spool shaft back and forth in its axial direction.

With this configuration, load that is generated both for rotating the rotor and for oscillating the spool is imparted on the pinion gear and the master gear, because the pinion gear, which is meshingly engaged with the master gear, is integral with the rotor and is also engaged with the driven gear of the spool oscillating mechanism. As a result, a great deal of force is required to turn the handle. Also, the master gear and the pinion gear can easily break down or wear out from friction, which lessens durability of the spinning reel overall.

Further, the accelerated rotation of the pinion gear is directly transmitted to the driven gear of the traverse camshaft. Therefore, the traverse camshaft also rotates faster for every rotation of the rotor. As a result, the spool oscillates at a higher frequency so that the fishing line is wound onto the fishing line winding portion of the spool with only a small gap between adjacent windings. Consequently, a shorter length of fishing line is wound onto the fishing line winding portion per each oscillation of the spool. The spool must be made bigger in order to increase the length of fishing line wound per oscillation, but this would render the spinning reel bulky and heavy.

The latter problem can be solved by reducing the spiral pitch of the traverse cam groove in order to reduce the length that the spool shaft moves per each rotation of the traverse camshaft. However, a traverse camshaft with such a narrow pitch groove would be difficult to machine and expensive to produce. Moreover, the traverse camshaft would have low mechanical strength because the peak areas between adjacent turns of the groove are narrower, which reduces durability of the traverse camshaft.

On the other hand, a transmission can be provided for decelerating speed from the pinion gear to the driven gear. However, as described above it is desirable that the pinion gear rotate at a high rotational speed to increase the rotational speed of the rotor, which increases the fishing line winding length for each rotation of the handle. In order to cancel out the increased rotational speed of the pinion gear, the driven gear of the traverse camshaft must be made with a diameter that is almost equal to the diameter of the master gear. Such a construction is not practical, because such a bulky driven gear would require an excessively bulky installation space. If the gear ratio between the master gear and the pinion gear is set to near 1:5, then a gear ratio between the pinion gear and the driven gear of 5:1 would result in the driven gear being turned once for every turn of the master gear. In order to rotate the driven gear less than once for each turn of the master gear, the gear ratio between the pinion gear and the driven spiral gear would have to be increased even further, which would require the gears after the pinion gear to have a large diameter, which would require more space in the reel body. Also, each acceleration or deceleration transmission results in a loss of drive force. That is, a deceleration transmission is a situation wherein one turn of a drive-source side gear results in less than one turn of a downstream-side gear. Similarly, an acceleration transmission is a situation wherein one turn of a drive-source side gear results in more than one turn of a downstream-side gear. A situation wherein one turn of a drive-source side gear results in one turn of a downstream-side gear will be referred to as a synchronous transmission hereinafter.

Japanese Utility Model Publication No. SHO-60-26626 discloses a spinning reel similar to the above described conventional spinning reel, wherein a pinion gear is integrally and coaxially connected to a rotor and a driven gear is integrally and coaxially connected to a traverse camshaft. The pinion gear is engaged with a master gear. An intermittent feed gear and an intermediate transmission gear are additionally provided. The intermittent feed gear is provided integrally with the pinion gear so that the intermittent feed gear is rotatable together with the rotation of the pinion gear. The intermediate transmission gear is interposed between the intermittent feed gear and the driven gear and results in a deceleration transmission to the traverse camshaft.

Unexamined Japanese Patent Application Publication No.HEI-11-86 discloses a spinning reel with a gear shaft that integrally links rotation of a pinion gear and a traverse cam shaft. The gear shaft is supported on the reel body and has a helical gear at one portion and a worm gear at another portion. The helical gear is meshingly engaged with a helical gear of the pinion gear and the worm gear is in meshing engagement with a worm wheel provided on the traverse cam shaft. This configuration results in a deceleration transmission from the handle to the traverse camshaft.

However, in both of these configurations, the pinion gear, which is subjected to an acceleration transmission, drives both a mechanism for rotating the rotor and a mechanism for oscillating the spool. Therefore, these configurations only overcome the above-described problem of how to reduce the oscillation pitch of the spool. They still include all of the other problems described above. Furthermore, extra housing space is required to house the intermittent gear and the intermediate gear, or the gear shaft, the helical gear, and the worm gear, which results in a bulkier and heavier reel body.

Unexamined Japanese Utility Model Publication No. 3-31860 discloses a spinning reel wherein rotation of the master gear and the traverse cam shaft are integrally linked by gears and an intermediate shaft supported on the reel body. That is, a spur gear is formed on the outer peripheral surface of the master gear and a helical gear is provided on a traverse cam shaft. A spur gear meshingly engaged with the spur gear of the master gear and a helical gear meshingly engaged with the helical gear of the traverse cam shaft are fixed to the intermediate shaft. With this configuration, the system for driving oscillating movement of the spool is separate from the pinion gear. However, the master gear is subjected to abrasion from the load applied in its axial direction by the pinion gear and also in its radial direction by the spur gear of the master gear, and so is easily damaged. The problem of the reel having poor durability remains. Also, housing space is required to house the spur gear of the master gear, the helical gear, and the intermediate shaft, which results in a bulkier and heavier reel body.

Unexamined Japanese Utility Model Publication No. 7-44132 discloses a spinning reel with a connection gear that is formed with an integral small-diameter spur gear and large-diameter helical gear that link drive of a hollow handle shaft and a traverse cam shaft. The small-diameter spur gear is in meshing engagement with a spur gear provided on the hollow handle shaft together with the master gear. The large-diameter helical gear is in meshing engagement with a helical gear provided on the traverse cam shaft. This configuration also separates the system for transmitting drive for oscillating the spool from the pinion. However, because the connection gear, which includes the integral small-diameter spur gear and large-diameter helical gear, is interposed between the spur gear of the hollow handle shaft and the helical gear of the traverse cam shaft, the small-diameter spur gear and large-diameter helical gear must be made thicker to increase the durability of the connection gear. The connection becomes more bulky, which results in a bulkier and heavier reel body. Also, spur gears can only be meshingly engaged in fixed directions, so the freedom of design is limited.

SUMMARY OF THE INVENTION

It is an objective of the present invention to overcome the above-described problems and provide a spinning reel that has only a small oscillating spool pitch for each single turn of the rotor so that a long length of fishing line can be wound for each single turn of the rotor without increasing the size of the spool, that has a simplified configuration and high freedom of design, and that is durable, compact, light-weight, and easy to operate.

In order to achieve the above-described problems, a spinning reel according to the present invention includes a reel body having a front portion; a shaft sleeve rotatably supported by the reel body; a handle shaft insertedely mounted in the shaft sleeve and rotatable integrally with the shaft sleeve; a handle connected to the handle shaft; a master gear coaxially and integrally provided on the shaft sleeve; a spool shaft extending in a frontward/rearward direction of the reel body and oscillatingly movably supported on the reel body; a spool fixed to the spool shaft and having a fishing line winding portion; a rotor positioned at the front portion of the reel body and rotatably supported by the reel body; a fishing line guide portion provided to the rotor for winding a fishing line over the fishing line winding portion upon rotation of the rotor; a pinion gear provided integrally with the rotor and meshingly engaged with the master gear; a traverse camshaft rotatably supported in parallel with the spool shaft by the reel body and formed with a cam groove; a slider member fixed to the spool shaft and having a pawl engaged with the cam groove, the slider member being movable in a lengthwise direction of the traverse camshaft upon rotation of the traverse camshaft; a driving spiral gear fixedly provided on the shaft sleeve at a position separated from the master gear; a driven spiral gear fixedly provided on the traverse camshaft; and at least one intermediate spiral gear for transmitting rotation of the driving spiral gear to the driven spiral gear.

With this configuration, the mechanism for transmitting drive force from the handle shaft to oscillate the spool, that is, the driving spiral gear, the at least one intermediate spiral gear, and the driven spiral gear, is independent from the mechanism for transmitting drive force from the handle shaft to rotate the rotor, that is, the master gear and the pinion shaft. As a result, the load on the master gear and the pinion gear is reduced, so that abrasion and damage to the master gear and the pinion gear is reduced.

If the outer diameter of the driving spiral gear is made smaller than the outer diameter of the master gear, then the load on the master gear and the pinion gear can be further reduced, and also the load required to rotate the handle can be reduced so that the handle can be rotated easily and rapidly, resulting in a more enjoyable fishing experience.

Also, if no acceleration transmission is performed at the initial stage for transmitting drive force from the shaft sleeve to the traverse cam shaft, the traverse cam shaft can be rotated by a reasonable number of times for each rotation of the rotor. This results in a small sliding oscillation pitch that increases the line winding length per handle turn without increasing the size of the spool, so that the spinning reel can be made more light-weight and compact.

Because the drive force from the shaft sleeve is transmitted to the traverse cam shaft through the intermediate spiral gear, rather than a spur gear for example, rotational force can be reliably and smoothly transmitted with little backlash. Moreover, spiral gears can be oriented with teeth extending either to intersect perpendicularly with or in parallel with the axial direction of the spool shaft. This enhances freedom of design for assembling the drive transmission mechanisms in the limited housing space of the reel body. Also, assembling operations can be simplified.

When only a single intermediate spiral gear is used to transmit drive from the driving spiral gear to the driven spiral gear, drive transmission loss and backlash can be suppressed to a minimum. Further, sliding spool oscillation can be smoothly performed. Also, configuration is simple and assembly is simplified. Also, because a minimum number of components are required, production costs and parts management costs can be reduced. Also, space required in the housing can be reduced so that the spinning reel can be made compact in size and light in weight.

BRIEF DESCRIPTION OF THE DRAWINGS

The above and other objects, features and advantages of the invention will become more apparent from reading the following description of the embodiment taken in connection with the accompanying drawings in which.

DETAILED DESCRIPTION OF THE EMBODIMENTS

Next, spinning reels according to embodiments of the present invention will be described while referring to the attached drawings.

Figure 1:
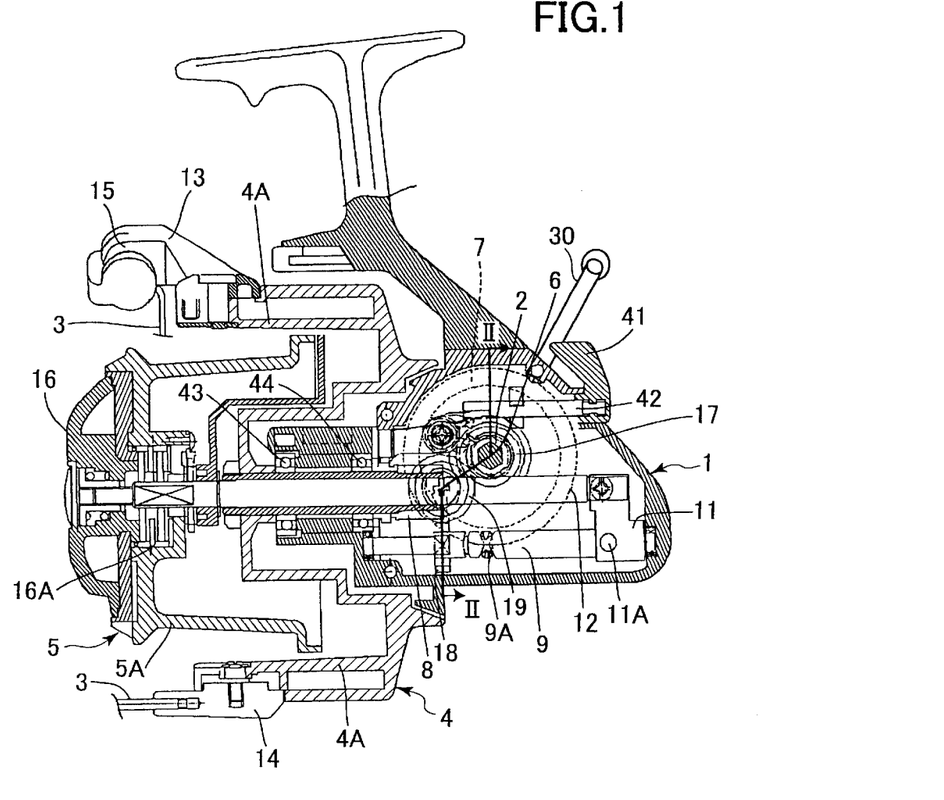
FIG. 1 is a cross-sectional view showing a spinning reel according to an embodiment of the present invention.
Figure 2:
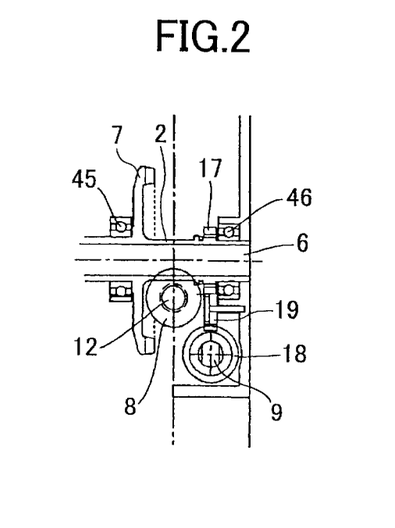
FIG. 2 is a cross-sectional view taken along line II—II of FIG. 1.

A spinning reel according to a first embodiment is shown in FIGS. 1 to 2. The spinning reel according to the first embodiment includes a reel body 1, a rotor 4 and a spool 5 that are provided at the front of the reel body 1 and that are rotatably supported by the reel body 1, a drive mechanism, a rotor rotation mechanism, and a spool oscillating mechanism. The drive mechanism includes a handle 30, a shaft sleeve 2, and a handle shaft 6. The handle 30 is provided on the reel body 1 and is connected to the handle shaft 6. The handle shaft 6 passes through and is fixed to a shaft sleeve 2, so that the shaft sleeve 2 and the handle shaft 6 are driven to rotate integrally by rotation of the handle 30.

The rotor rotation mechanism transmits drive force from the drive mechanism to the rotor 4 and includes a master gear 7 and a pinion gear 8. The master gear 7 is formed on the shaft sleeve 2. The pinion gear 8 is formed with a smaller diameter that the diameter of the master gear 7, resulting in an acceleration transmission from the master gear 7 to the rotor 4.

The spool oscillating mechanism is for oscillating the spool 5 back and forth and includes a traverse cam shaft 9, a slider member 11, and a spool shaft 12. The traverse cam shaft 9, which is formed with a cam groove 9a, is rotatably supported on the reel body 1 and is driven to rotate by the drive mechanism in an interlocked manner with the rotor rotation mechanism. The spool 5 is attached to one end of the spool shaft 12. The spool shaft 12 is provided in the reel body 1 so as to be oscillating slidable in the front and rear directions. The slider member 11 is fixed to the spool shaft 12. The slider member 11 has a pawl 11A that is engaged in the cam groove 9a of the traverse cam shaft 9, so that the slider member 11 oscillatingly slides along the lengthwise direction of the traverse cam shaft 9 upon rotation of the traverse cam shaft 9 as the pawl 11 follows the cam groove 9a.

The rotor 4 includes a bale 3 and is formed with a pair of arms 4A, 4A. A bale arm lever 13 is rotatably fitted on one of the bale arms 4A. A bale arm holder 14 is fitted on the other bale arm 4A. A roller 15 is provided on the bale arm holder 14. The bale arm holder 14 and the roller 15 serve as a fishing line guide portion for winding a fishing line over a fishing line winding portion 5a of the spool 5 upon rotation of the rotor 4. The bale 3 is supported between the bale arm holder 14 and the roller 15 so that the posture of the bale 3 can be freely switched between a line winding posture and a line release posture by swinging the bale arm holder 14 and the roller 15 one way or the other The spinning reel of the present embodiment is operated to wind up fishing line by rotating the handle 30 in the same way as a conventional spinning reel. Each rotation of the handle 30 is multiplied through the master gear 7 and the pinion gear 8, resulting in an acceleration transmission to rotate the rotor 4. Rotational force of the rotor 4 draws the fishing line toward the spool 5 as guided by the roller 15, and winds the fishing line around the fishing line winding portion 5a of the spool 5.

A drag mechanism 16A for adjusting drag force applied to the fishing line is mounted in the reel body 1. The drag mechanism 16A can be adjusted using a drag knob 16, which is screwed onto the front end of the spool shaft 12 at the front of the spool 5. When tension applied to the fishing line exceeds the drag force set by the drag mechanism 16A, then the spool 5 rotates with respect to the spool shaft 12, although applied with a braking force. This prevents the fishing line from snapping.

The spool oscillating mechanism further includes a driving spiral gear 17, a driven spiral gear 18, and a single intermediate spiral gear 19 for transmitting rotation of the master gear 7 to the traverse cam shaft 9. That is, the driving spiral gear 17, which has a smaller diameter than the master gear 7, is mounted on the shaft sleeve 2 along with the master gear 7 at a position separated from the master gear 7 in the axial direction of the shaft sleeve 2. The driven spiral gear 18 is fixed on the traverse cam shaft 9. The single intermediate spiral gear 19 is rotatably supported on the reel body 1 and transmits rotation of the driving spiral gear 17 to the driven spiral gear 18. That is, as shown in FIG. 2, the intermediate spiral gear 19 includes an intermediate spiral gear shaft protruding from the reel body 1 in parallel with the shaft sleeve 2, and an intermediate spiral gear wheel rotatably supported by the intermediate spiral gear shaft. It should be noted that a spiral gear is a helical gear with teeth at its outer periphery having a slant angle of 45 degrees.

The configuration of the spool oscillating mechanism will be described in more detail. The shaft sleeve 2 is provided to rotate integrally with the handle 30 and is disposed with its axis of rotation extending between the sides of the reel body 1, that is, in a direction that intersects perpendicularly with the spool shaft 12. The driving spiral gear 17 is formed together with the master gear 7 on the shaft sleeve 2 so as to have a diameter smaller than that of the master gear 7. The intermediate spiral gear 19 is meshingly engaged with the driving spiral gear 17 and is supported on a shaft that extends with its axis of rotational in parallel with the shaft sleeve 2. The driven spiral gear 18 is meshingly engaged with the intermediate spiral gear 19 and is provided on the traverse cam shaft 9, which is supported on the reel body 1 so that its axis of rotation extends in parallel with the spool shaft 12, that is, in the front-to-rear direction of the reel body 1.

Because the outer diameter of the driving spiral gear 17 is smaller than the outer diameter of the master gear 7, and the driven spiral fear 19 is driven by the driving spiral gear 17 via the master gear 7 and the pinion gear 8), the load on the master gear 7 and the pinion gear 8 is reduced, so that abrasion and damage to the master gear 7 and the pinion gear 8 is reduced.

The mechanism for transmitting drive from the handle 30 to oscillate the spool 5 is independent from the acceleration transmission from the pinion shaft 8 to the master gear 7. As a result, the load required to rotate the handle 30 can be reduced so that the handle 30 can be rotated easily and rapidly, resulting in a more enjoyable fishing experience.

As described above, the drive force from the shaft sleeve 2 (the driven spiral gear 18) is transmitted to the traverse cam shaft 9 (the driving spiral gear 17) through the intermediate spiral gear 19. Because the intermediate spiral gear 19 is a spiral gear rather than spur gear, rotational force can be reliably and smoothly transmitted with little backlash. Moreover, gears can be oriented with teeth extending either to intersect perpendicularly with or in parallel with the axial direction of the spool shaft 12. This enhances freedom of design for assembling the drive transmission mechanisms in the limited housing space of the reel body 1. Also, assembling operations can be simplified.

The driving spiral gear 17 does not increase rotational number like the master gear 7 does. Because there is no acceleration transmission at this initial stage for transmitting drive force from the shaft sleeve 2 to the traverse cam shaft 9, the traverse cam shaft 9 can be rotated by a reasonable number of times for each rotation of the rotor 4. This results in a small sliding oscillation pitch that increases the line winding length per handle turn without increasing the size of the spool 5, so that the spinning reel can be made more light-weight and compact.

It should be noted that the small pitch of sliding oscillation of the spool 5 is not only beneficial for increasing the length of line wound onto the spool 5. For example, a small-diameter fishing line that has little resistance from contact with itself can be wound onto the spool 5 with adjacent turns of the line in relatively close proximity, so that the small-diameter and low resistance properties of conventional fishing lines can be fully utilized during casting.

In the present embodiment, the initial stage of drive force transmission from the shaft sleeve 2 to the traverse cam shaft 9 is either a synchronous or deceleration transmission from the driving spiral gear 17 to the intermediate spiral gear 19. Even if after this synchronous or deceleration transmission is performed, the drive transmission from the intermediate spiral gear 19 to the driven spiral gear 18 is designed to be an acceleration transmission that increases the number of rotations, the handle 30 can still be easily rotated. Also, drive transmission efficiency of the driven spiral gear 18 after the intermediate spiral gear 19 can be enhanced. As a result, the load required to rotate the handle 30 can be reduced so that the handle 30 can be rotated easily and rapidly, resulting in a more enjoyable fishing experience.

In the present embodiment, the driving spiral gear 17 has an outer diameter that is the same or larger than the diameter of the intermediate spiral gear 19. With this configuration, drive is transmitted from the driving spiral gear 17 to the intermediate spiral gear 19 in a synchronous or deceleration transmission. Therefore, the handle 30, which rotates synchronously with the shaft sleeve 2 on which the driving spiral gear 17 is formed, is easier to rotate. Further, drive transmission to the driven spiral gear 18, which is downstream from the intermediate spiral gear 19, can be enhanced and transmission noise can be reduced. Also, drive load to the driven spiral gear 18 can be reduced, not only to the driving spiral gear 17 and the intermediate spiral gear 19, so that abrasion and damage to these members can be reduced. By separating the mechanisms for oscillating the spool from the mechanism for rotating the rotor, load on the master gear and on the pinion gear can be reduced and abrasion and damage to these components can be reduced.

Because only a single intermediate spiral gear 19 is used to transmit drive from the driving spiral gear to the driven spiral gear, drive transmission loss and backlash can be suppressed to a minimum. Further, sliding spool oscillation can be smoothly performed. Also, configuration is simple and assembly is simplified. Also, because a minimum number of components are required, production costs and parts management costs can be reduced. Also, space required in the housing can be reduced so that the spinning reel can be made compact in size and light in weight.

By performing an acceleration transmission from the intermediate spiral gear 19 to the driven spiral gear 18 after the synchronous or deceleration transmission from the driving spiral gear 17 to the intermediate spiral gear 19, the pitch of the spool sliding oscillation for each rotation of the rotor can be increased. If the pitch of spool sliding oscillation is increased, then when the fishing line is braid fishing line and the winding angle at which the turns in adjacent layers of wound up line intersect each other is increased to approach a right angle, then the braid fishing line can be wound with greater spacing between adjacent turns of the same layer. As a result, resistance from contact between turns of the same layer and with turns of lower layers can be reduced so that the fishing line can be fed out with low resistance during casting.

In the present embodiment, the driving spiral gear 17 and the intermediate spiral gear 19 are formed with the same outer diameter or with the driving spiral gear 17 having a larger outer diameter, so that drive is transmitted from the driving spiral gear 17 formed on the shaft sleeve 2 to the intermediate spiral gear 19 by a synchronous or deceleration transmission. However, the intermediate spiral gear 19 can be formed with an outer diameter that is smaller than that of the driving spiral gear 17 in order to perform an acceleration transmission from the driving spiral gear 17 to the intermediate spiral gear 19.

Further, the present embodiment describes the intermediate spiral gear 19 and the driven spiral gear 18 disposed so that their rotational axes intersect substantially perpendicular with each other. That is, the intermediate spiral gear 19, which is meshingly engaged with the driving spiral gear 17, is supported on the reel body 1 so that its rotational axis extends between the sides of the reel body 1. The driven spiral gear 18, which is meshingly engaged with the intermediate spiral gear 19, is provided on the traverse cam shaft 9, which is supported on the reel body 1 so that its rotational axis extends in the front-to-rear direction of the reel body 1. In addition, a second intermediate spiral gear can be interposed between driven spiral gear 18 and the intermediate spiral gear 19 so that its rotational axis extends substantially perpendicular with the rotational axis of one or the other of the driven spiral gear 18 or the intermediate spiral gear 19. That is, the second intermediate spiral gear can be supported on the reel body 1 so that its rotational axis extends between the sides of the reel body 1. In this case, the rotational axis of the second intermediate gear would extend substantially perpendicular to the rotation axis of the driven spiral gear 18 and substantially parallel with the rotational axis of the intermediate spiral gear 19. Alternately, the second intermediate spiral gear can be supported on the reel body 1 so that its rotational axis extends in the front-to-rear direction of the reel body 1. In this case, the rotational axis of the second intermediate gear would extend substantially perpendicular to the rotation axis of the intermediate spiral gear 19 and substantially parallel with the rotational axis of the driven spiral gear 18. By interposing a second intermediate gear between the driving spiral gear 17 and the driven spiral gear 18, freedom of design of the spinning reel can further be enhanced. Also, the transmission rate of drive from the driving spiral gear 17 to the driven spiral gear 18 can be increased or decreased with greater freedom.

Here, further components shown in FIGS. 1 and 2 will be described. As shown in FIG. 1, an operation lever 41 and a conversion shaft 42 are provided as part of a reverse rotation mechanism of the rotor 4. That is, when the operation lever 41 is pivoted one way or the other, the conversion shaft 42 switches the rotor 4 from a condition wherein both forward (wind up) and backward (feed out) rotation is possible to a condition wherein backward rotation is impossible. A cam provided on the front tip of the conversion shaft 42 selectively engages and releases engagement between a pawl provided on the reel body 1 and a ratchet formed integrally with the front portion of the pinion gear 8. It should be noted that there are many types of well-known reverse rotation mechanisms, all of which can be applied to the present invention. For example, a roller member position can be switched with respect to the inner race and outer race of a one way roller clutch.

Ball bearings 43, 44 are provided for enabling rotation of the rotor 4 supported at the front end of the reel body 1. As shown in FIG. 2, bearings 45, 46 are provided for enabling rotation of the shaft sleeve 2 supported between the side walls of the reel body 1.

Next, a second embodiment of the present invention will be described while referring to FIGS. 3 and 4. The spinning reel according to the second embodiment has a configuration similar to the spinning reel of the first embodiment, so like components will be indicated with the same numbering and their detailed description will be omitted to avoid redundant explanation.

Figure 3:
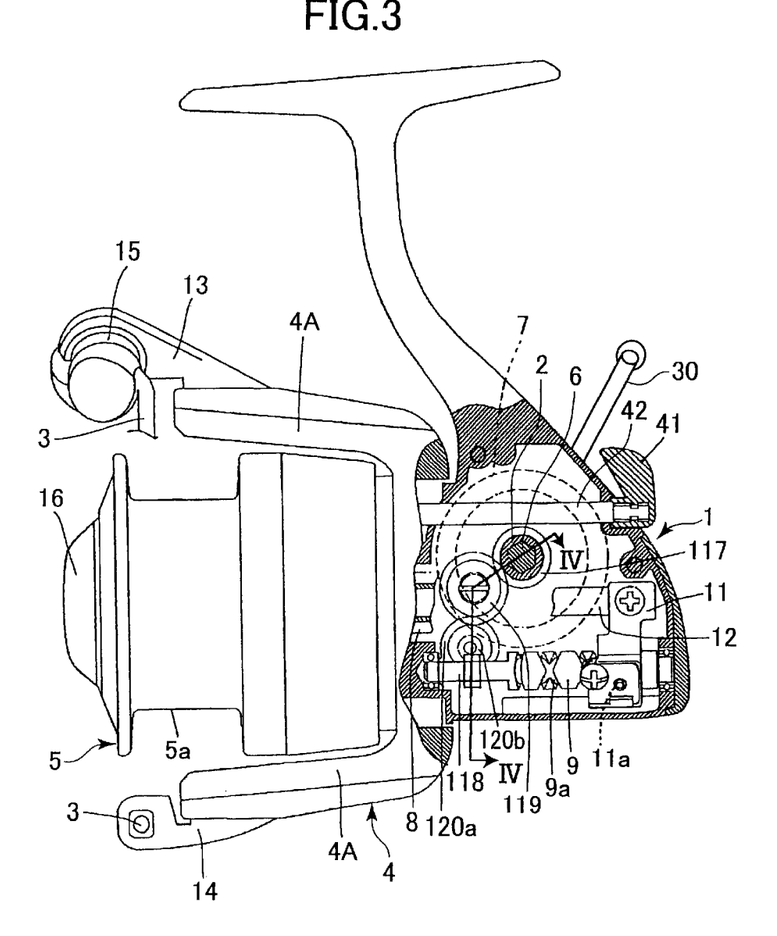
FIG. 3 is a cross-sectional view showing a spinning reel according to a second embodiment of the present invention.
Figure 4:
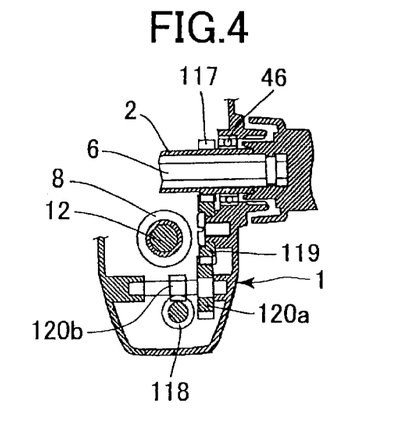
FIG. 4 is a cross-sectional view taken along line IV—IV of FIG. 3.

As shown in FIGS. 3 and 4, the spool oscillating mechanism of the second embodiment includes a second intermediate spiral gear 120a and a third intermediate spiral gear 120b in addition to a driving spiral gear 117, a driven spiral gear 118, and an intermediate spiral gear 119. Drive force from the driving spiral gear 117 is transmitted to the driven spiral gear 118 through the intermediate spiral gear 119, the second intermediate spiral gear 120a, and the third intermediate spiral gear 120b.

The spool oscillating mechanism of the second embodiment will be described in more detail. The driving spiral gear 117 is mounted on the shaft sleeve 2 together with the master gear 7 and has an outer diameter that is smaller than the outer diameter of the master gear 7. The intermediate spiral gear 119 is supported on the reel body 1 with its rotational axis extending between the sides of the reel body 1 and is meshingly engaged with the driving spiral gear 117. The second intermediate spiral gear 120a is supported on the reel body 1 so that its rotational axis extends between the sides of the reel body 1 and is meshingly engaged with the intermediate spiral gear 119. The third intermediate spiral gear 120b is formed integrally on the same rotational shaft as the second intermediate spiral gear 120a. The driven spiral gear 118 is provided on the traverse cam shaft 9, which is supported on the reel body 1 so that its rotational axis extends in the front-to-rear direction of the reel body 1, and is meshingly engaged with the second intermediate spiral gear 120a. With this configuration, the rotational axis of the second intermediate spiral gear 120a and the third intermediate spiral gear 120b intersects substantially perpendicularly with the rotational axis of the driven spiral gear 118.

The second embodiment includes five spiral gears for transmitting drive from the shaft sleeve 2 to the traverse cam shaft 9. Therefore, the rotation number can be more increased or decreased during drive transmission with greater freedom by changing various gear ratios. Also, design can be more freely performed to correspond to the housing space. Moreover, because the outer diameter of the 117 is smaller than the outer diameter of the master gear 7 and the spool oscillating mechanism is operated by the driving spiral gear 117, the load on the master gear 7 and on the pinion gear 8 can be reduced so that abrasion and damage to these components can be reduced.

Next, a third embodiment of the invention will be described while referring to FIGS. 5 to 7. The spinning reel according to the third embodiment has a configuration similar to the spinning reel of the first embodiment, so like components will be indicated with the same numbering and their detailed description will be omitted to avoid redundant explanation.

Figure 5:
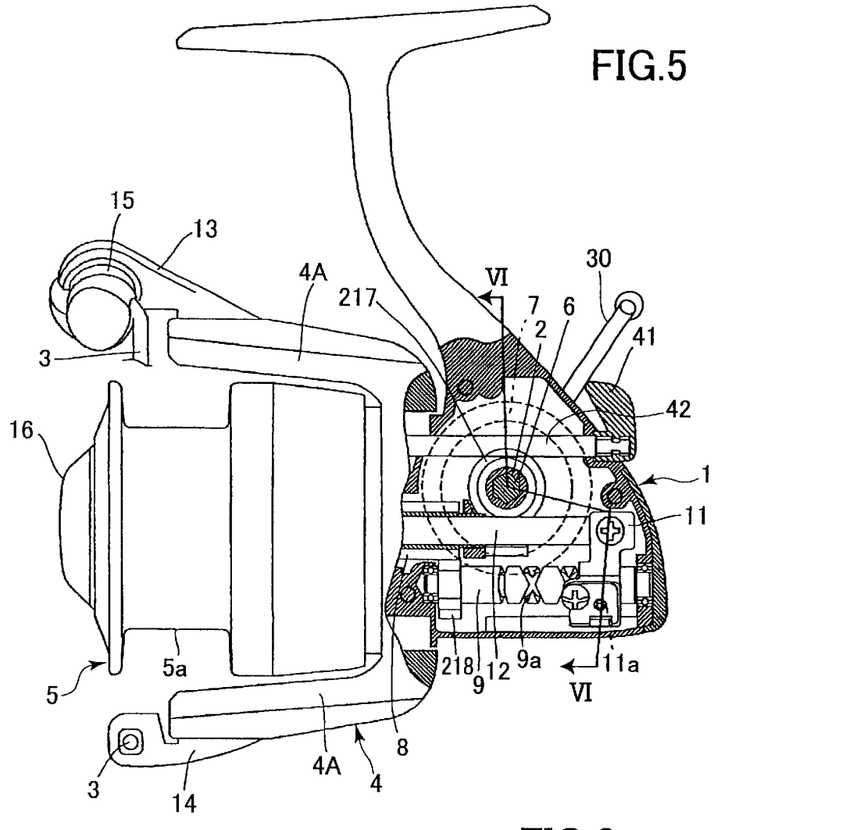
FIG. 5 is a cross-sectional view showing a spinning reel according to a third embodiment of the present invention.
Figure 6:
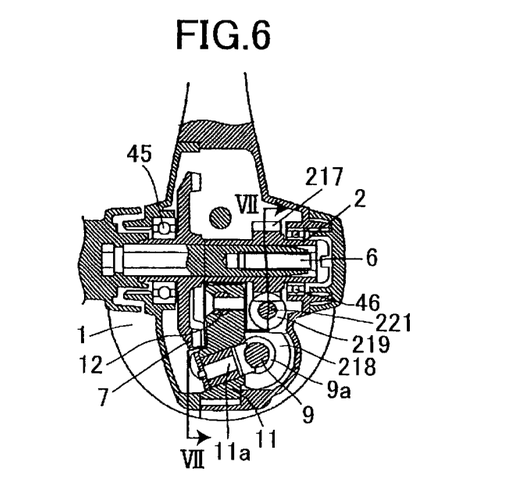
FIG. 6 is a cross-sectional view taken along line VI—VI of FIG. 5.
Figure 7:
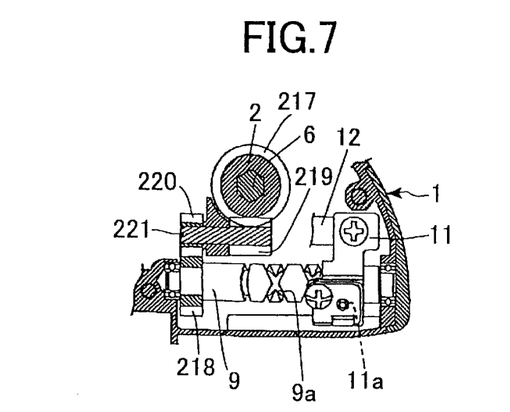
FIG. 7 is a cross-sectional view taken along line VII—VII of FIG. 6.

As shown in FIGS. 5 to 7, the spool oscillating mechanism of the present embodiment includes a second spiral gear 220 and a rotational shaft 221 in addition to a driving spiral gear 217, a driven spiral gear 218, and an intermediate spiral gear 219. The rotational shaft 221 is rotatably provided so as to extend in the front-to-rear direction of the reel body 1. The intermediate spiral gear 219 and the second spiral gear 220 are provided on either end of the rotational shaft 221. Rotation drive of the driving spiral gear 217 is transmitted to the driven spiral gear 218 through the intermediate spiral gear 219 and the second spiral gear 220.

The spinning reel according to the third embodiment will be described in more detail. The shaft sleeve 2 is provided rotatably on the reel body 1 so that its rotational axis extends between the sides of the reel body 1. The driving spiral gear 217 is provided on the shaft sleeve 2 together with the master gear 7. The intermediate spiral gear 219 is provided on one end of the rotational shaft 221. The intermediate spiral gear 219 is meshingly engaged with the driving spiral gear 217. The second spiral gear 220 is provided on the other end of the rotational shaft 221 so that rotational drive from the intermediate spiral gear 219 is transmitted to the second spiral gear 220. The driven spiral gear 218 is provided on the traverse cam shaft 9, which is supported on the reel body 1 so that its rotational shaft extends in the front-to-rear direction of the reel body 1. The second spiral gear 220 is meshingly engaged with the driven spiral gear 218. With this configuration, the rotational shaft of the intermediate spiral gear 219 intersects substantially perpendicularly with the rotational axis of the driving spiral gear 217.

Accordingly, drive force is transmitted from the driving spiral gear 217, which is formed on the shaft sleeve 2, to the intermediate spiral gear 219. As a result, the operation of driving the spool oscillating mechanism is separated from drive transmission through the master gear 7 and the pinion gear 8. As a result, the handle 30 is easier to rotate. Also, abrasion and damage to the drive transmission system, such as, to the master gear 7, can be reduced in the same manner as with the first embodiment.

Because drive force from the driving spiral gear 217 of the shaft sleeve 2 is transmitted to the traverse cam shaft 9 through the rotational shaft 221, which is oriented in the front-to-rear direction of the reel body 1, the traverse cam shaft 9 and other components can be positioned almost anywhere in the reel body 1 without increasing the side-to-side thickness of the reel body reel body 1, by merely changing the tilt angle or the length of the rotational shaft 221. This enhances freedom of design that the components can be assembled in the limited housing space of the reel body 1.

Figure 8:
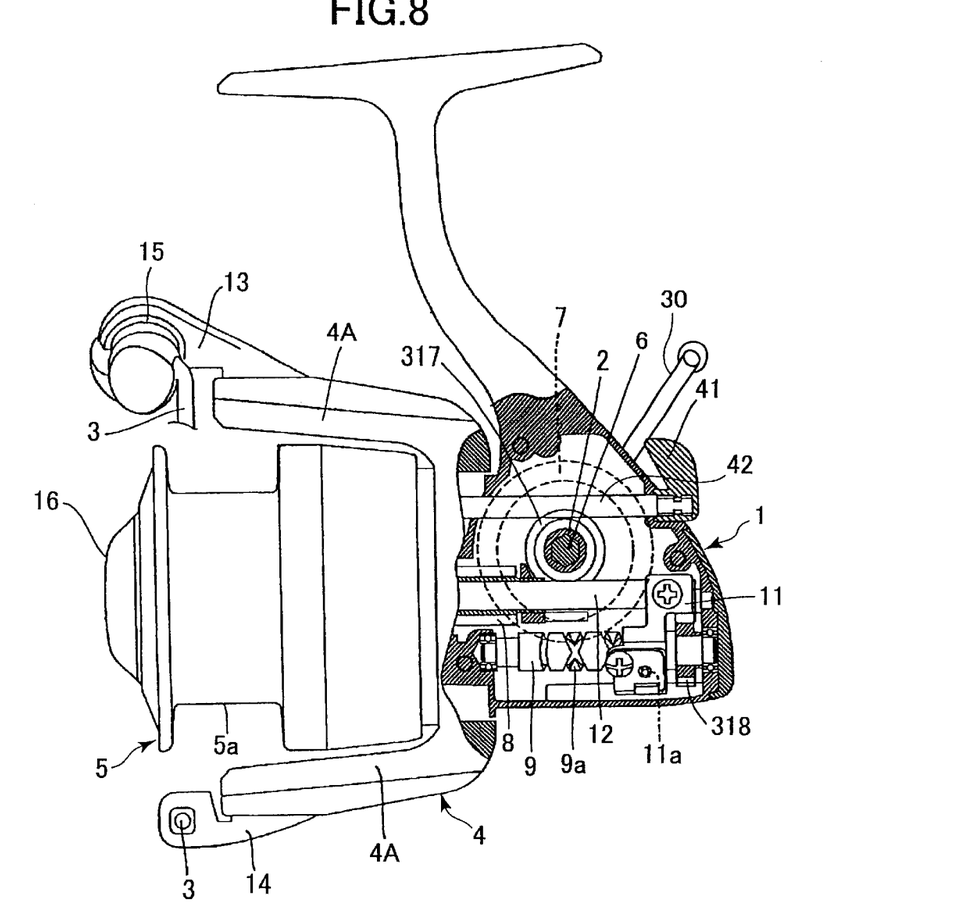
FIG. 8 is a cross-sectional view showing a modification of the third embodiment.
Figure 9:
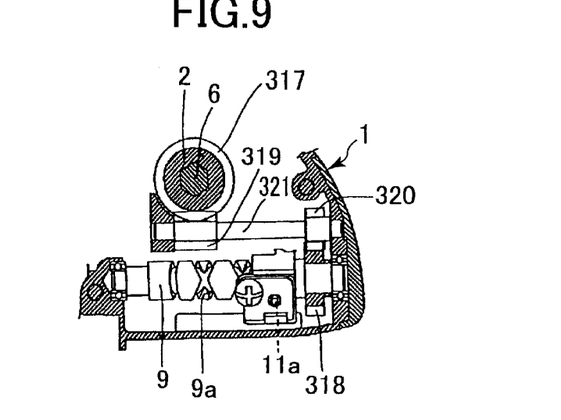
FIG. 9 is a cross-sectional view showing essential portions of FIG. 8.

Here, a modification of the third embodiment will be described while referring to FIGS. 8 and 9. In the modification, a rotational shaft 321 is made longer than the rotational shaft 221 of the third embodiment, and also an intermediate spiral gear 319 and a second spiral gear 320 are attached to opposite ends of the rotational shaft 321 than the intermediate spiral gear 219 and the second spiral gear 220 of the third embodiment so that the second spiral gear 320 and the driven spiral gear 318 can be located in the rear portion of the reel body 1.

Figures 10, 11, 12:
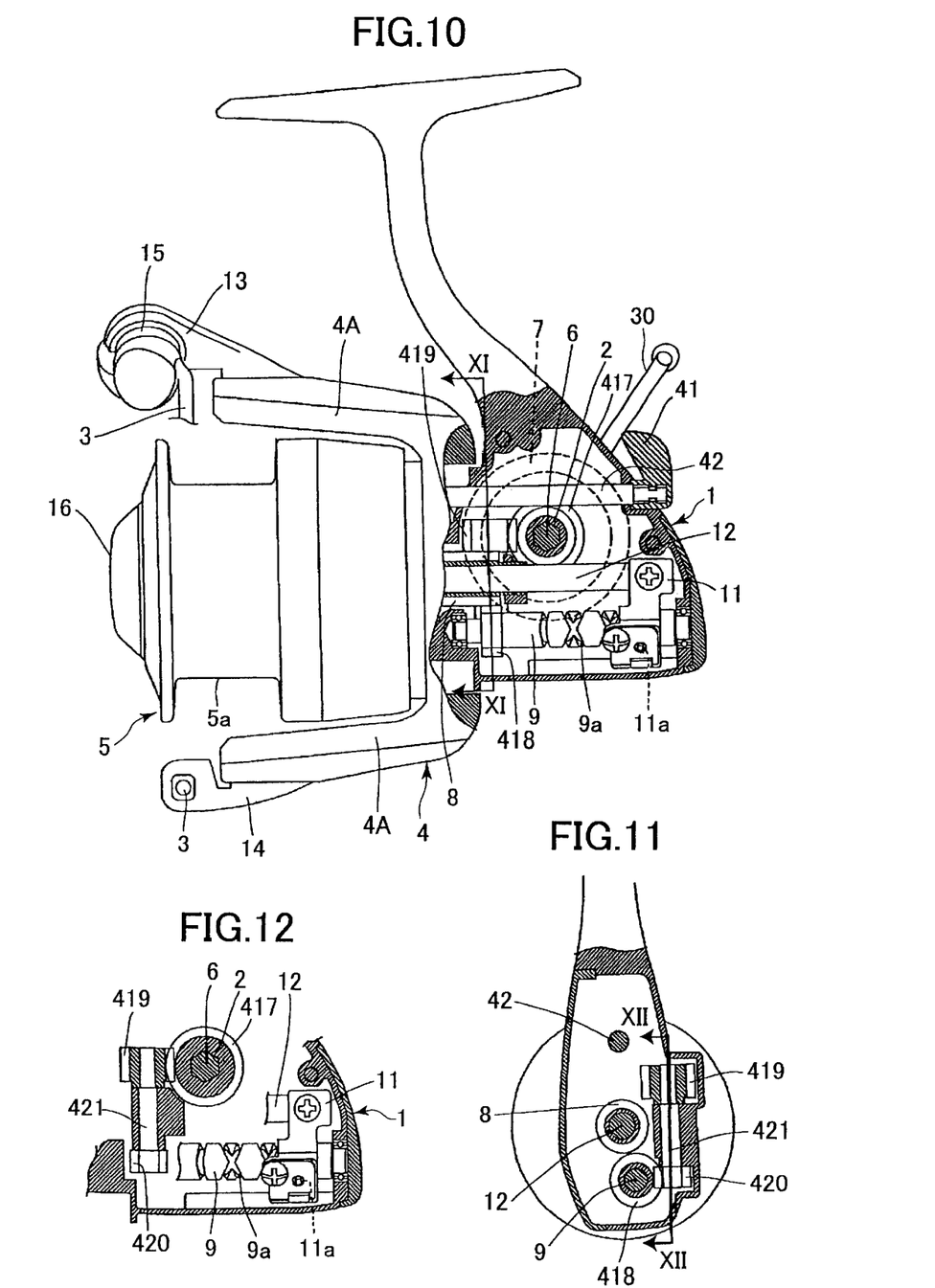
FIG. 10 is a cross-sectional view showing a spinning reel according to a fourth embodiment of the present invention.
FIG. 11 is a cross-sectional view taken along line XI—XI of FIG. 10.
FIG. 12 is a cross-sectional view taken along line XII—XII of FIG. 11.

Next, a fourth embodiment of the present invention will be described while referring to FIGS. 10 to 12. The spinning reel according to the fourth embodiment has a configuration similar to the spinning reel of the first embodiment, so like components will be indicated with the same numbering and their detailed description will be omitted to avoid redundant explanation.

The spool oscillating mechanism of the fourth embodiment includes a rotational shaft 421 that is rotatably disposed so as to extend vertically in the reel body 1. An intermediate spiral gear 419 is disposed at the upper end of the rotational shaft 421 and a second spiral gear 420 is disposed at the lower end of the rotational shaft 421 to transmit drive force from a driving spiral gear 417 to a driven spiral gear 418.

Here, the fourth embodiment will be described in greater detail. The shaft sleeve 2 is provided so that its rotational axis extends between the sides of the reel body 1. The driving spiral gear 417 is provided on the shaft sleeve 2 together with the master gear 7. The driving spiral gear 417 is meshingly engaged with the intermediate spiral gear 419. The drive force from the intermediate spiral gear 419, which is provided on one end of the rotational shaft 421, is transmitted to the second spiral gear 420, which is provided on the other end of the rotational shaft 421. The second spiral gear 420 is meshingly engaged with the driven spiral gear 418. The driven spiral gear 418 is provided on the traverse cam shaft 9, which is supported on the reel body 1 with its rotational axis extending in the front-to-rear direction of the reel body 1. With this configuration, the rotational axes of the driving spiral gear 417 and the intermediate spiral gear 419, and of the second spiral gear 420 and the driven spiral gear 418, intersect substantially perpendicularly with each other.

Accordingly, transmission of drive from the driving spiral gear 417 to the driven spiral gear 418 of the spool oscillation mechanism is performed independently from the master gear 7 and the pinion gear 8. Therefore the load on the master gear 7 and on the pinion gear 8 can be reduced so that abrasion and damage to these components can be reduced.

Further, because drive force is transmitted from the shaft sleeve 2 to the traverse cam shaft 9 through the vertically-oriented rotational shaft 421, the traverse cam shaft 9 and other components can be positioned almost anywhere in the reel body 1 without increasing the side-to-side thickness of the reel body reel body 1, by merely changing the tilt angle or the length of the rotational shaft 421. This enhances freedom of design that the components can be assembled in the limited housing space of the reel body 1.

What is claimed is:

1. A spinning reel comprising:
   a reel body having a front portion;
   a shaft sleeve rotatably supported by the reel body;
   a handle shaft insertedely mounted in the shaft sleeve and rotatable integrally with the shaft sleeve;
   a handle connected to the handle shaft;
   a master gear coaxially and integrally provided on the shaft sleeve;
   a spool shaft extending in a frontward/rearward direction of the reel body and oscillatingly movably supported on the reel body;
   a spool fixed to the spool shaft and having a fishing line winding portion;
   a rotor positioned at the front portion of the reel body and rotatably supported by the reel body;
   a fishing line guide portion provided to the rotor for winding a fishing line over the fishing line winding portion upon rotation of the rotor;
   a pinion gear provided integrally with the rotor and meshingly engaged with the master gear;
   a traverse camshaft rotatably supported in parallel with the spool shaft by the reel body and formed with a cam groove;
   a slider member fixed to the spool shaft and having a pawl engaged with the cam groove, the slider member being movable in a lengthwise direction of the traverse camshaft upon rotation of the traverse camshaft;
   a driving spiral gear fixedly provided on the shaft sleeve at a position separated from the master gear;
   a driven spiral gear fixedly provided on the traverse camshaft; and
   at least one intermediate spiral gear for transmitting rotation of the driving spiral gear to the driven spiral gear.

2. The spinning reel as claimed in claim 1, wherein the driving spiral gear has a diameter equal to a diameter of the intermediate spiral gear.

3. The spinning reel as claimed in claim 1, wherein the driving spiral gear has a diameter smaller than a diameter of the intermediate spiral gear.

4. The spinning reel as claimed in claim 1, wherein the traverse camshaft extends in parallel with the spool shaft, and the shaft sleeve extends in a direction perpendicular to the spool shaft; and
   wherein the intermediate spiral gear is rotatably supported on an intermediate spiral gear shaft that protrudes from the reel body in parallel with the shaft sleeve.

5. The spinning reel as claimed in claim 1, wherein the at least one intermediate spiral gear includes a plurality of intermediate spiral gears in meshing engagement with each other.

6. The spinning reel as claimed in claim 5, wherein the traverse camshaft extends in parallel with the spool shaft, and the shaft sleeve extends in a direction perpendicular to the spool shaft; and wherein the at least one intermediate spiral gear includes a first intermediate spiral gear meshingly engaged with the driving spiral gear and having a rotation axis in parallel with the handle shaft; a second intermediate spiral gear meshingly engaged with the first intermediate spiral gear and having a rotation axis in parallel with the handle shaft; and a third intermediate spiral gear provided coaxially with and integrally with the second intermediate spiral gear, the third intermediate spiral gear being meshingly engaged with the driven spiral gear.

7. The spinning reel as claimed in claim 5, wherein the traverse camshaft extends in parallel with the spool shaft, and the shaft sleeve extends in a direction perpendicular to the spool shaft; and wherein the at least one intermediate spiral gear includes a first intermediate spiral gear meshingly engaged with the driving spiral gear and having a rotation axis perpendicular to the handle shaft; a second intermediate spiral gear provided coaxially with and integrally with the first intermediate spiral gear, the second intermediate spiral gear being meshingly engaged with the driven spiral gear.

8. The spinning reel as claimed in claim 7, further comprising a support shaft rotatably supported by the reel body and extending in parallel with the traverse camshaft, the first and second intermediate gears being fixed to the support shaft.

9. The spinning reel as claimed in claim 7, further comprising a support shaft rotatably supported by the reel body and extending in a vertical direction perpendicular to the handle shaft and the traverse camshaft, the first and second intermediate gears being fixed to the support shaft.

10. The spinning reel of claim 1, wherein the driving spiral gear, the driven spiral gear and the at least one intermediate spiral gear are helical gears with teeth at their outer periphery being slanted at a slant angle of 45 degrees.

* * * * *